June 29, 1948.   J. W. KLINE   2,444,298
JUICE EXTRACTOR WITH VACUUM CUP ROTOR
Filed Oct. 29, 1943   2 Sheets-Sheet 1
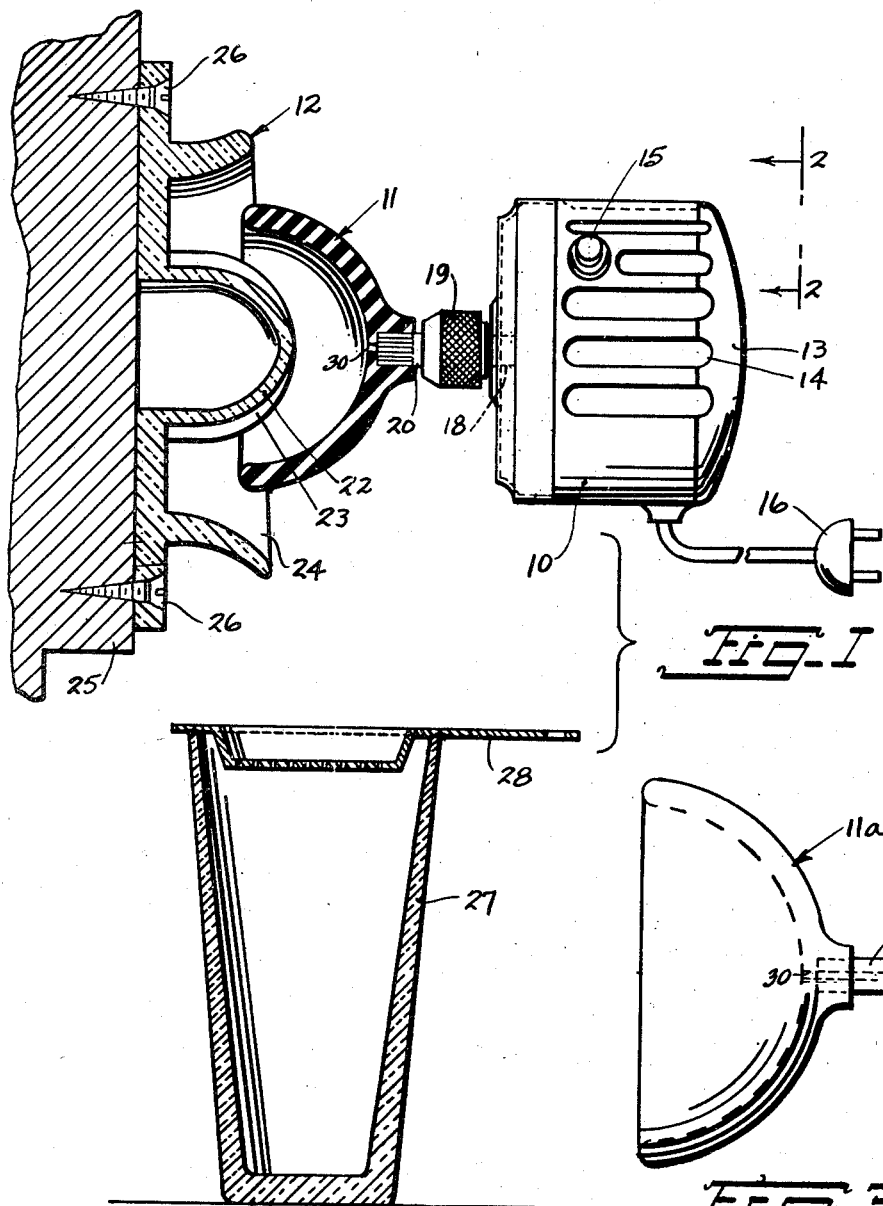
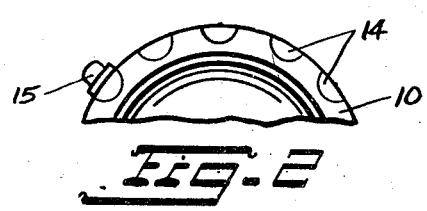
INVENTOR.
JOSEPH W. KLINE
BY
ATTORNEY.

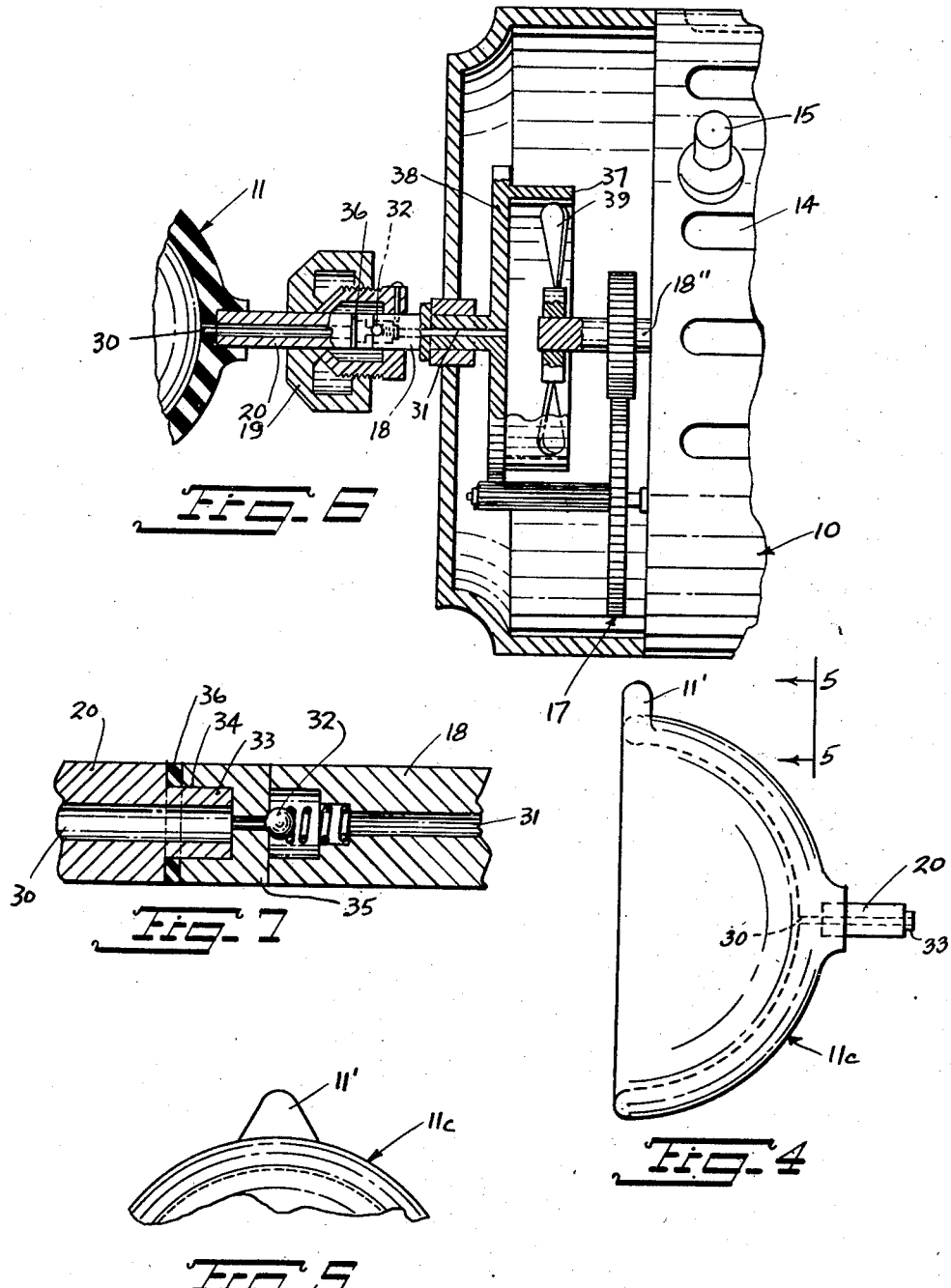

Patented June 29, 1948

2,444,298

UNITED STATES PATENT OFFICE 2,444,298

JUICE EXTRACTOR WITH VACUUM CUP ROTOR

Joseph W. Kline, New York, N. Y.

Application October 29, 1943, Serial No. 508,193

5 Claims. (Cl. 146—3)

This invention relates to new and useful improvements in a juice extractor. More particularly, it relates to an extractor for citrus fruits such as oranges, lemons, grapefruit, etc.

This invention proposes a juice extractor which is an improvement over juice extractors generally used at present in the household and other places. The popular way of extracting juice of citrus fruit in the home is by the use of a glass or other material bowl-like member having a truncated cone-like central projection formed rounded at the top and provided with cutting burrs along the sides. The citrus fruit is cut into halves, and are manually engaged against said truncated cone-like projection and turned around and pressed down to extract the juice. This system is wasteful and unsanitary because the juice often actually contacts the hands.

The new juice extractor is characterized by a small electric motor which may be held in the palm of one's hand, a resilient material suction cup shaped member removably mounted on the driven shaft of said motor for gripping by suction which is immediately created when said member is pressed down upon half sections of citrus fruit and/or gripping by other types of suction and rotating or spinning said half sections of citrus fruit which may then be conveniently pressed against cutting means which may be a group of knife-like edges in truncated cone-like shape, with a rounded top and means to strain and gather the juice.

It is proposed that the electric motor be of a design and shape so that the back of the motor may fit into the palm of one's hand and one's fingers may engage down along the sides of the motor for holding same. It is proposed that a conveniently located switch be arranged on the motor operable by a finger or fingers, to start, stop and control rotations of said cup shaped member. Preferably, the electric motor should include a speed gear reduction.

It is proposed that several resilient suction cup shaped members be provided to grip fit the range of sizes of the various citrus fruits. It is proposed that a suction cup shaped member be provided for small, medium and large sized fruits. With this arrangement it is possible to select a desired suction cup shaped member for a fruit size and mount it upon the motor shaft as needed.

The invention further contemplates that the juice extractor be used in conjunction with a cutting, gathering, and/or straining means. This means may comprise the usual plastic, metal or glass bowl which is rested on a table when used, and which has a centrally projecting truncated cone with a rounded top and a plurality of projecting side burrs or it may comprise other cutting means mounted on a wall, or any type of cutting, gathering and straining means having a stationary truncated cone-like member against which the half citrus fruit may be pressed and cut, and also customary gathering and straining means.

Furthermore, modifications of the invention are proposed embodying the basic principle of providing a motor-driven resilient material suction cup shaped member for holding by suction and rotating or spinning half citrus fruit for juice extraction purposes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary side elevational view of the juice extractor shown in association with a sectional view of a complementary stationary cone juice cutting means, and straining and gathering means.

Fig. 2 is a fragmentary elevational view looking in the direction of the line 2—2 of Fig. 1;

Fig. 3 is an elevational view of a resilient material suction cup shaped member of a different size than the one shown in Fig. 1, which may be substituted therefor.

Fig. 4 is a side elevational view of another resilient material suction cup shaped member of a modified form.

Fig. 5 is a fragmentary elevational view looking in the direction of the line 5—5 of Fig. 4.

Fig. 6 is an enlarged fragmentary sectional view of a portion of Fig. 1.

Fig. 7 is a fragmentary enlarged sectional view of the shaft ends within the chuck shown in Fig. 6.

The juice extractor, in accordance with this invention, includes a small electric motor 10 which may be held in the palm of one's hand, and a resilient material suction cup shaped member 11 mounted on the driven shaft of said motor 10 for holding by suction and rotating or spinning half of a citrus fruit, which may then be conveniently pressed against a stationary cone cutter means, such as schematically indicated by the reference numeral 12. The electric motor 10 has a curved back portion 13 upon which the palm of the hand may be placed. One's fingers may extend down along the sides of the motor 10 which are formed with grooves 14 into which the fingers may be rested for better gripping and holding said motor. A switch 15 is mounted upon the motor casing and is operable by one's finger or fingers and is for the purpose of controlling said motor. The motor 10 is provided with the usual electric cord and plug 16 for connection with a house circuit.

The electric motor 10 is shown provided with a gear speed reduction unit 17 which drives the shaft 18. A standard chuck 19 is mounted on the shaft 18 and is adapted to hold the stud or stem 20 of the suction cup shaped member 11. This member 11 preferably is formed of a rubber. The stud or stem 20 is mounted on and projects from the back of the suction cup shaped member 11. The chuck 19 may be turned to release the stud or stem 20 and then the suction cup shaped member 11 may be removed and replaced with other similar members as required.

The cutting means 12 is in the nature of a glass, metal or composition body having a central truncated cone-like portion 22 formed with a plurality of cutting burrs 23. An annular cup-like wall 24 surrounds the cone portion 22. The means 12 may be secured to a wall 25 by fastening elements 26. A glass or other vessel 27 with the usual strainer 28 may be placed beneath the cutting, gathering and straining means 12 to catch the juice as it runs down.

An arrangement is provided for increasing the vacuum of the suction cup shaped member 11 for more securely holding the picked up half citrus fruit. This arrangement includes forming the resilient material suction cup shaped member 11 with a small passage 30 extending through its central axis and through the support stud or stem 20. The driven shaft 18 is provided with a complementary passage 31 aligned with said passage 30. A one way valve 32 is mounted upon the outer end of the shaft 18. The adjacent end of the stud or stem 20 is formed with a reduced end portion 33 adapted to fit into a complementary recess 34 formed in the housing 35 of said one way valve 32. A rubber gasket 36 is permanently mounted upon the end of the housing 35 so as to form an airproof connection between the passages 30 and 31. The passage 31 terminates within a hollow cylindrical baffle wall 37 formed upon the side of one of the gears 38 of said speed reduction unit 17. A fan 39 is mounted on the shaft 18'' of said electric motor 10. This fan 39 is located within said hollow cylindrical baffle wall 37.

In Fig. 3 another resilient material suction cup shaped member 11a is disclosed similar to the one previously described, but distinguished merely by size. This is to illustrate that various sizes may be supplied with each juice extractor.

The operation of the device may best be understood from the following.

The citrus fruit from which the juice is to be extracted is first cut into halves. These halves are rested on a table or counter on their flat sides. The juice extractor is held in one's hand with the cup shaped member 11 directed downwards. It is moved down against the curved top of one of the halved fruits and firmly pressed against same so that the cup shaped member, by suction grips and holds the half fruit. The juice extractor with the held half fruit is now moved over to cutting means, which as previously stated, may be of any design and construction. If it is in the nature of the cutting means shown on the drawing and indicated by reference numeral 12, it is merely necessary to set the electric motor 10 into operation by pressing the switch 15, and then moving the hand so as to engage the spinning half fruit against the cutting means 12. The juice will run down through the strainer 28 and collect in the vessel 27.

The fan 39 supplements the vacuum of the suction cup shaped member 11. The chuck 19 which is mounted on the shaft 18 may be turned to free the stud or stem 20 which permits the suction cup shaped member 11 to be removed. The same suction cup shaped member may be replaced, or another suction cup shaped member of different size substituted, when desired. The stud or stem of the suction cup shaped member 11 which is used must be engaged into the chuck 19 and moved all the way in so that it compresses the washer 36 on the end of the body 35 of the one way valve 32 for preventing leakage of air from the passages 30 and 31. When the suction cup shaped member 11 of the juice extractor is forced against the back of a half citrus fruit the valve 32 will lift to allow the escape of air from the suction cup shaped member 11. The juice extractor may then be moved to the complementary cutting means, as before explained. When the electric motor 10 is set into operation the fan 39 will suck air through the passage 31, lifting the valve 32 to open the passage 30 and so supplement the suction of the suction cup shaped member 11. This insures holding the half citrus fruit very firmly.

Of course, the juice extractor could be used with a cutting means other than that indicated by the reference numeral 12, which cutting means may be rested on a table. In that event the spinning half fruit is also engaged against it so that the juice collects within the compass of its juice holding wall. The juice must then be poured through a strainer and into a vessel. When the juice is completely extracted the shell of the half fruit is gripped and pulled out from the cup shaped member 11 and discarded. The juice extractor is now ready to be moved down on another half fruit for repeating the operation.

It should be clearly understood that the suction cup shaped member 11 must be of a smaller diameter than the diameter of the half fruit. In this way it will come down upon it so that a little pressure will exhaust some of the air from the suction cup shaped member 11, producing vacuum by which the half fruit may be lifted.

In Figs. 4 and 5 a modified form of resilient material suction cup shaped member has been disclosed which is characterized by the provision of a means for facilitating the breaking of the vacuum after the juice extracting operation has been completed. More specifically, the suction cup shaped member 11c is substantially of identical construction as that disclosed in the first form of the invention, differing merely in the provision of a small projecting tab 11' projecting outwards from the outer circumference of the member 11c and which may be gripped in the fingers and pulled to pull away a side portion of the cup shaped member, and thus break the vacuum, so that the remains of the half fruit may be easily removed. Preferably, the tab 11' is formed by the same mold used for making the member 11c.

In other respects this form of the invention is identical to the previous form and like parts are identified by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A juice extractor, comprising a small electric motor to be held in the palm of one's hand and having a driven tubular shaft, a resilient material suction cup having a hollow stem axially aligned with and mounted on said tubular shaft for holding by suction and rotating or spinning half of a citrus fruit, cutting means for said citrus fruit while being rotated or spun, and suction creating means connected with said tubular shaft.

2. A juice extractor, comprising a small electric motor to be held in the palm of one's hand and having a driven tubular shaft, a resilient material suction cup having a hollow stem axially aligned with and mounted on said tubular shaft for holding by suction and rotating or spinning half of a citrus fruit, cutting means for said citrus fruit while being rotated or spun, and suction creating means connected with said tubular shaft, including a one way valve mounted within said tubular shaft for tending to maintain the vacuum in said suction cup.

3. A juice extractor, comprising a small electric motor to be held in the palm of one's hand and having a driven tubular shaft, a resilient material suction cup having a hollow stem axially aligned with and mounted on said tubular shaft for holding by suction and rotating or spinning half of a citrus fruit, cutting means for said citrus fruit while being rotated or spun, and suction creating means connected with said tubular shaft, including means for restraining air from passing through said tubular shaft in the direction of said suction cup.

4. A juice extractor, comprising an electric motor having a driven shaft, a tubular shaft rotatively mounted on said electric motor, a transmission from the shaft of said electric motor for driving said tubular shaft, a fan connected with the shaft of said electric motor for producing suction in said tubular shaft, a resilient material suction cup having a hollow stem axially aligned with and mounted on said tubular shaft for holding by suction and rotating or spinning half of a citrus fruit, cutting means for said citrus fruit while being rotated or spun, and a one way valve mounted within said tubular shaft for tending to maintain the vacuum in said suction cup.

5. In a juice extractor, a small electric motor to be held in the palm of one's hand and having a driven shaft provided with a chuck, cutting means for citrus fruit while being rotated or spun, a resilient material suction cup shaped member for holding by suction and rotating and spinning half of a citrus fruit which may then be manually pressed against said cutting means, a stud coaxially mounted on the back of and projecting from said resilient material suction cup shaped member and engaging in said chuck and having a small passage for air to pass from said suction cup shaped member, a one way valve controlling said small passage, and means for producing suction through said small passage.

JOSEPH W. KLINE.

REFERENCES CITED

The following references are of record in the file of this patent:

UNITED STATES PATENTS

| Number | Name | Date |
|---|---|---|
| 713,382 | Beamer | Nov. 11, 1902 |
| 855,594 | Stecker | June 4, 1907 |
| 1,304,892 | Leefeld | May 27, 1919 |
| 1,550,844 | Puterbaugh | Aug. 25, 1925 |
| 1,686,598 | Broadbent | Oct. 9, 1928 |
| 1,784,301 | Mekler | Dec. 9, 1930 |
| 1,883,791 | Jewell | Oct. 18, 1932 |
| 1,955,217 | Arbuckle | Apr. 17, 1934 |
| 2,177,967 | Watkins | Oct. 31, 1939 |

FOREIGN PATENTS

| Number | Country | Date |
|---|---|---|
| 405,079 | Great Britain | Feb. 1, 1934 |